United States Patent [19]

Kent

[11] 4,442,621
[45] Apr. 17, 1984

[54] SELF-PROPELLED TROLLER

[76] Inventor: John E. Kent, #A-3, 900 Siskiyou Blvd., Medford, Oreg. 97501

[21] Appl. No.: 370,538

[22] Filed: Apr. 21, 1982

[51] Int. Cl.³ .......................................... A01K 97/00
[52] U.S. Cl. .................................................. 43/26.1
[58] Field of Search ............................... 43/26.1, 26.2

[56] References Cited

U.S. PATENT DOCUMENTS

| 2,804,712 | 9/1957 | Jackson | 43/26.1 |
| 3,106,796 | 10/1963 | Friedland | 43/26.1 |
| 3,106,797 | 10/1963 | Hancock | 43/43.11 |
| 3,149,435 | 9/1964 | Nordeen | 43/26.1 |
| 3,203,131 | 8/1965 | Myers | 43/26.1 |
| 3,739,516 | 6/1973 | Holling | 43/26.1 |
| 3,758,975 | 9/1973 | Curtis | 43/26.1 |
| 3,793,761 | 2/1974 | Bonham | 43/26.1 |
| 4,161,077 | 7/1979 | Ciaccio et al. | 43/26.1 |

Primary Examiner—Gene P. Crosby
Attorney, Agent, or Firm—Kolisch, Hartwell, Dickinson & Anderson

[57] ABSTRACT

A self-propelled troller having an elongate hull which is powered by a rear propeller for movement in a forward direction in water. An elongate tube in the troller extends from the bow of the hull rearwardly of, and below, the propeller. A fishing line adapted to be received slidably through the tube, in a bow-to-stern direction, is used to guide the troller toward the direction of pull on the line.

9 Claims, 3 Drawing Figures

SELF-PROPELLED TROLLER

BACKGROUND AND SUMMARY

The present invention relates to a self-propelled troller.

Self-propelled trollers used for trolling or for carrying a baited fish line to a remote location from shore are known in the prior art. One known troller of this type employs a plurality of different lines, including a fishing line, a shore-to-boat control line, and a trolling line attached separately to the boat. The several lines increase the amount of work required to set up a trolling operation. The lines also have a tendency to become entangled with one another.

In another known type of remote-controlled troller, a fishing line is equipped with a line enlargement adapted to trip a reverse-direction switch when the line is reeled in, causing the troller to reverse direction in response to tension in the fishing line. The extent to which this troller can be guided by an onshore fisherman is generally limited to forward and reverse directions.

One general object of the present invention is to provide a remote-controlled troller which is intended to be guided by a single fishing line in a desired trolling path by an operator onshore or in an onshore boat.

Another object of the invention is to provide in such a troller, a construction which functions to isolate the troller substantially from the line of force in the fishing line when a fish has been hooked at the end of the line.

Yet another object of the present invention is to provide in such a troller, a line-handling construction which reduces the tendency of the line to fray or otherwise become damaged.

The self-propelled troller of the present invention includes an elongate flotation hull having bow and stern ends. The hull is powered for movement in a forward direction by a powered propeller located near the stern end of the hull. An elongate tube in the troller extends from the bow of the hull rearwardly of the propeller. The tube is adapted to receive a fishing line slidably therethrough in a bow-to-stern direction, allowing the troller to be guided in the water toward the direction of pull on the line.

In a preferred embodiment of the invention, the tube extends from the bow end of the hull, through a forward portion thereof, downwardly and rearwardly beneath the propeller.

These and other objects and features of the present invention will become more fully apparent when the following detailed description of a preferred embodiment of the invention is read in conjunction with the accompanying drawings.

DETAILED DESCRIPTION OF A PREFERRED EMBODIMENT OF THE INVENTION

Figure 1:
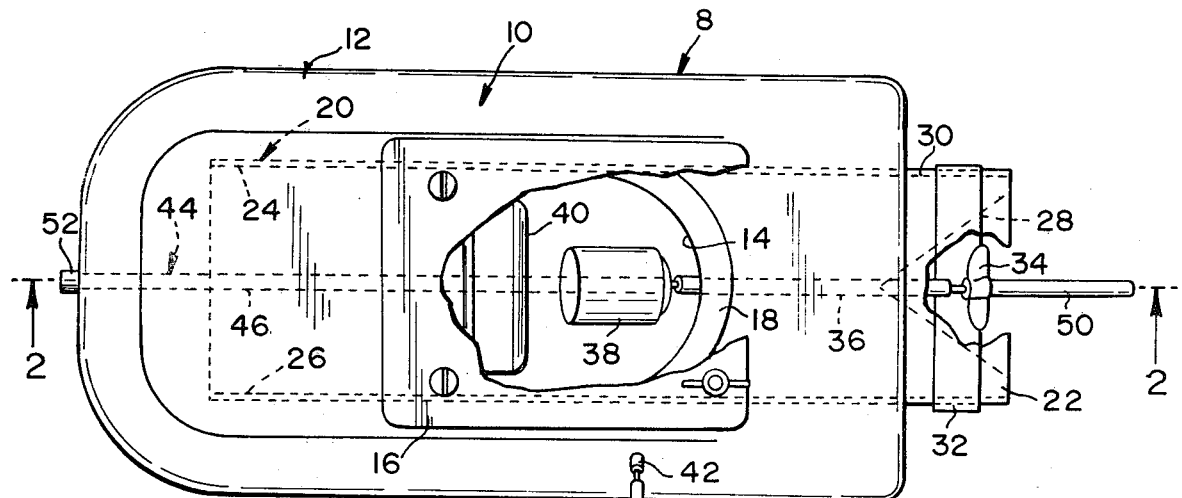
FIG. 1 is a top view of a troller constructed according to the present invention, with parts cut away.
Figure 2:
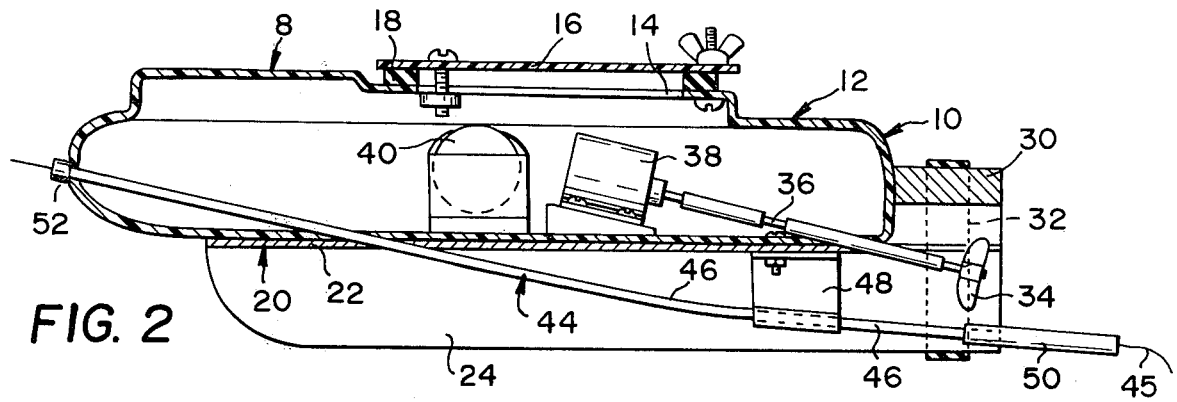
FIG. 2 is a sectional view taken generally along line 2—2 in FIG. 1.

Turning now to the drawings, and first particularly to FIGS. 1 and 2, there is shown generally at 8 a remote-controlled troller constructed according to the present invention. The troller includes an elongate flotation hull 10 which is seen in top view in FIG. 1 and in sectional view in FIG. 2. The hull is composed of a hollow shell 12, the interior of which is accessed by an opening 14 formed in a central portion of the shell's upper side. Opening 14 is covered, during troller operation, by a cover plate 16. The cover plate is releasably attachable to the hull by the nut and bolt arrangements seen in FIGS. 1 and 2. The plate is sealed over opening 14 by a seal 18.

Also included in the hull is a fin structure 20 mounted, as by riveting, to the lower side of the shell. Structure 20, which is generally trough shaped, includes a mounting plate 22 and a pair of opposed, parallel stabilizing fins 24, 26. The longitudinal extent of structure 20 in relation to shell 12 is seen in FIG. 2. In particular, the shell, including the two fins therein, extends somewhat beyond the stern end of the shell. The portion of plate 20 extending rearwardly of the shell is notched at 28 (FIG. 1).

The rearwardly extending notched portion of structure 20 may be covered, during troller operation, by a cover member 30 which is constructed to rest on the rearwardly extending notched portion of plate 22. The member is secured to structure 20 by a rubber band 32 or the like encircling the member and structure.

A propellor 34 carried on a shaft 36 is mounted on hull 10 for powered rotation about the shaft's long axis. The propeller is driven by an electric motor 38 mounted within shell 12 and powered by a replaceable battery or pair of batteries, such as bettery 40, also carried within the shell. The motor is activated by a push-pull switch 42 located on the exterior of shell 12, as seen in FIG. 1. The motor-powered propeller is used in propelling the troller in a forward direction in water.

According to an important feature of the present invention, the troller includes an elongate tube 44 which is adapted for receiving a portion of a fishing line, such as line 45 shown fragmentarily in FIG. 2, slidably therethrough. The tube includes a relatively inflexible tube section 46 extending from the bow end of the shell to a point below propeller 34, as seen in FIG. 2. Section 46, which is formed of relatively stiff metal tubing or the like, is supported, adjacent the stern end of shell 12, by a brace 48 encircling a portion of the tube section and attached to plate 22, as seen in FIG. 2. The tube also includes a section of flexible tubing 50 attached to the stern end of section 46, and extending rearwardly of propeller 34. The bow end of section 46 is likewise fitted with a section of flexible tubing 52. Tubing sections 50, 52 function to prevent sharp-angle sliding between a fishing line, such as line 45, and the ends of section 46.

The use of the troller in a typical trolling operation will now be described. A fishing line, such as line 45, is initially fed through tube 44 in a bow-to-stern direction. In order to limit the amount of line which can be paid out through tube 44, a barrel swivel or the like (not shown) is attached to the line at a desired position to the left of the tube in FIGS. 1 and 2. Likewise, a barrel swivel is used to connect the free end of the line to a leader line, to prevent the leader line from being reeled in through the tube. The leader line is preferably smaller than the fishing line so that if the leader line becomes snagged, it will break before the main fishing line does, on the distal side of the barrel swivel connecting the two lines, preventing the line from being pulled completely through tube 44.

With the leader line suitably weighted and prepared for fishing, the troller and free end of the fishing line are placed in the water, and the troller is pointed in a desired direction. With switch 42 turned on to activate the powered propeller, the troller begins to move in a forward direction through the water. As the boat travels away from the shore, or from an anchored boat, the fishing line is paid out to allow the boat to travel freely in a forward direction. Here it is noted that fins 24, 26 function to hold the troller on a relatively straight course in the absence of any external forces exerted on the line by the onshore fishermen. The fishing line may also be paid out at a rate somewhat faster than the rate of travel of the boat to allow bow-to-stern travel of the line through tube 44, to pay out the free end of the line as the troller travels into deeper water offshore.

Figure 3:
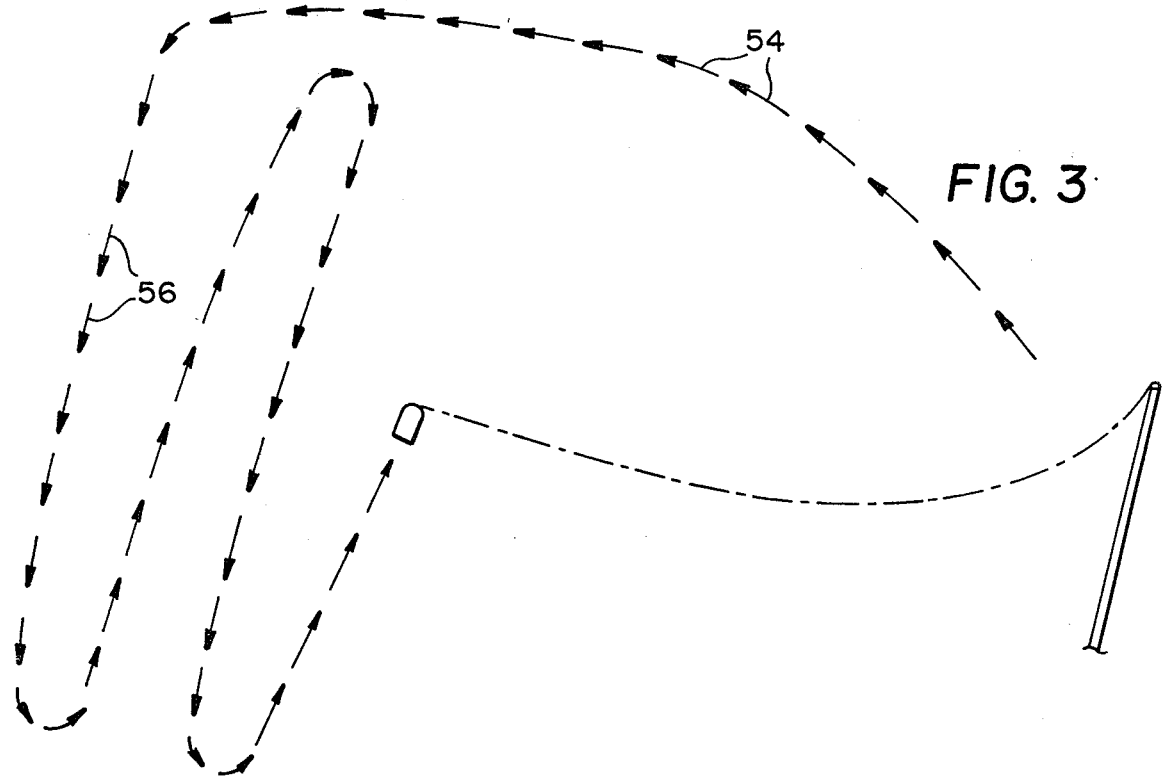
FIG. 3 shows a typical path along which the troller can be guided from an onshore position.

FIG. 3 illustrates one path of troller travel which may be produced from a remote position. The arrows, such as arrows 54 at the top of the figure represent the path of travel of the troller away from the remote position at the right in FIG. 3. The direction of travel of the troller may be changed at any time by pulling the line in the direction of desired turn. Thus, in FIG. 3, a fisherman, by placing the line to the left of the troller (below arrows 54 in FIG. 3) and pulling the line in, can turn the troller in the direction indicated by arrows 56 in the figure. The troller can be guided similarly in a series of opposite directions, as shown, by orienting the line on a desired side of the troller and pulling in on the line. Here it is noted that the flexible section of tubing 52 in tube 44 functions to prevent sharp-angle sliding contact between the fishing line and the bow end of tube section 46 when the troller is being manuevered in the manner just described.

Once a fish has been caught, the fisherman begins to reel in the line or otherwise "play" the fish in a conventional manner. It can be appreciated that with reeling in of the line, the troller becomes oriented for travel substantially toward the fisherman's position. Thus, tube 44 is maintained at all times substantially in line with the line tension produced by reeling in the fish. This alignment facilitates reeling in the line through tube 44 in a stern-to-bow direction when the line is being reeled in at a rate which is faster than the rate of travel of the troller toward the fisherman. The tube thus can be thought of as functioning to isolate the line from the troller during a reeling operation.

In certain settings, it is desirable to carry the fishing line out to a certain part of a lake or river before releasing the hooked end of the line. Usually, the end of the line, once dropped, is held at a desired position or water depth by a weight or flotation device on the line. To accomplish this type of line drop with the troller of the present invention, the fisherman places the weight or flotation device under band 32 to secure the line releasably to the band. After the troller reaches the position of desired line drop, the fisherman gives a sharp tug on the line, pulling the line through tube 44 in a stern-to-bow direction to pull the weight or flotation device on the line releasably out of engagement with band 32. The released line is then free to drop while the troller, having been pulled in the direction of the fisherman, advances toward the fisherman. The dropped position of the line remains relatively undisturbed by the troller movement toward the shore, due to the relatively free passage of the fish line through tube 44.

Several advantages of the present invention can now be appreciated. The troller is readily guided along virtually any desired trolling path by an operator pulling on a single fishing line disposed on a selected side of the troller. By this arrangement, a single line serves as both the fishing and the troller-control line.

The elongate tube in the troller effectively isolates the line from the troller after a fish has been caught and tension has been established in the line between the fishing reel and the fish. Thus, the extent to which the troller interfers with the reeling in of a fish is minimized.

The flexible tubing sections in tube 44 act to deflect the fishing line away from sharp-angle contact with the ends of tube section 46 to lessen the tendency of the line to fray. Stern end section 50, which extends substantially rearwardly of the propellor in the troller, also functions to keep the fishing line away from the propeller, where it could otherwise become entangled. Further, the disposition of the stern end of the tube below the propellor helps to stabilize the troller against tipping when a sudden force is applied to the line from the line's free end. The stiff tube section in the tube also helps shield the propeller against mechanical damages when the troller is pulled onshore, e.g., when pulling a fish up on a bank.

The two fins in the troller provide motional stability during trolling. They also help protect the bottom of the troller shell and the propeller when the boat is pulled onshore.

While a preferred embodiment of the present invention has been described herein, it will be apparent that various changes and modifications can be made without departing from the spirit of the invention.

It is claimed and desired to secure by Letters Patent:
1. A self-propelled troller comprising
   an elongate flotation hull having bow and stern ends,
   a powered propeller mounted adjacent the stern end of said hull for propelling the hull in a forward direction in water, and
   an elongate tube mounted on said hull, having one end adjacent the bow end of said hull and the tube extending from said one end to an opposite end disposed rearwardly of and below said propeller, said tube being adapted slidably to receive a fishing line and serving to position the fishing line where it first extends from said opposite end in a region below where the propeller operates.
2. The troller of claim 1 wherein said one end of said tube is disposed at a level above that of said propeller.
3. The troller of claim 1, wherein said hull includes a pair of stabilizing fins extending along the bottom of said hull and straddling said propeller.
4. A self-propelled troller in combination with a fishing line having a tethered and a free end, said troller comprising
   an elongate flotation hull having bow and stern ends,
   a powered propeller mounted adjacent the stern end of said hull for propelling the hull in a forward direction in water, and
   an elongate tube mounted on said hull, the tube having one end adjacent the bow end of said hull and the tube extending from said one end to an opposite end disposed rearwardly of said propeller, said tube slideably receiving a portion of said line, with the free end thereof disposed adjacent said opposite end of said tube.
5. The troller of claim 4, wherein said opposite end of said tube extending rearwardly of the propeller is disposed below the propeller.

6. The troller of claim 5, wherein said one end of said tube is disposed at a level above that of said propeller.

7. The troller of claim 5, wherein said tube includes a substantially inflexible portion extending from said bow end to a region adjacent said propeller, and a flexible end portion extending rearwardly of the propeller.

8. The troller of claim 4, which further includes means on said hull for releaseably holding a portion of said line for releaseable detachment upon pulling of said line through said tube in a stern-to-bow direction.

9. A self-propelled troller comprising
   a hull including an elongate flotation shell having bow and stern ends and a pair of stabilizing fins carried on the bottom of said shell and extending rearwardly from the shell's stern end,
   a powered propeller mounted on said shell and disposed between said fins, rearwardly of the shell, for propelling the hull in a forward direction in water, and
   an elongate tube including a substantially inflexible portion extending from the bow end of said shell, through a forward portion thereof downwardly and rearwardly beneath said propeller, and a flexible portion extending rearwardly of the propeller, said tube being adapted to receive a portion of a fishing line slideably extending therethrough.

* * * * *